(12) United States Patent
Liu et al.

(10) Patent No.: US 9,525,500 B2
(45) Date of Patent: Dec. 20, 2016

(54) LOW-COST TEST/CALIBRATION SYSTEM AND CALIBRATED DEVICE FOR LOW-COST TEST/CALIBRATION SYSTEM

(71) Applicant: MediaTek Inc., Hsin-Chu (TW)

(72) Inventors: Jen-Yang Liu, Taipei (TW); I-Cheng Tsai, Zhubei (TW); Hsueh-Wei Chiu, Kaohsiung (TW); Yuan-Hwui Chung, Tainan (TW); Chun-Hsien Peng, Xinyi Township, Nantou County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/953,673

(22) Filed: Nov. 30, 2015

(65) Prior Publication Data
US 2016/0112148 A1 Apr. 21, 2016

Related U.S. Application Data

(63) Continuation-in-part of application No. 14/696,807, filed on Apr. 27, 2015, which is a continuation of application No. 14/054,213, filed on Oct. 15, 2013, now abandoned, which is a continuation-in-part of application No. 13/480,969, filed on May 25, 2012, now Pat. No. 9,041,421.

(60) Provisional application No. 62/085,796, filed on Dec. 1, 2014, provisional application No. 61/731,845, filed on Nov. 30, 2012, provisional application No. 61/496,451, filed on Jun. 13, 2011.

(51) Int. Cl.
*H04B 17/00* (2015.01)
*H04B 17/29* (2015.01)

(52) U.S. Cl.
CPC .......... *H04B 17/29* (2015.01); *H04B 17/0085* (2013.01)

(58) Field of Classification Search
CPC .............................. H04B 17/29; H04B 17/0085
USPC ....................................................... 455/67.14
See application file for complete search history.

(56) References Cited

U.S. PATENT DOCUMENTS

| | | | |
|---|---|---|---|
| 6,543,034 B1 | 4/2003 | Goff et al. | |
| 7,679,391 B2 * | 3/2010 | Watanabe | G01R 31/31908 324/750.3 |
| 8,358,147 B2 * | 1/2013 | Pagani | G01R 31/3172 324/762.02 |

(Continued)

FOREIGN PATENT DOCUMENTS

| | | |
|---|---|---|
| CN | 101374317 | 2/2009 |
| CN | 101464491 | 6/2009 |

(Continued)

OTHER PUBLICATIONS

Erdogan, E.S., et al.; "Detailed Characterization of Transceiver Parameters;" IEEE Transactions on Very Large Scal Integrating (VLSI) Systems; vol. 18; No. 6; Jun. 2010; pp. 1-11.

(Continued)

*Primary Examiner* — April G Gonzales
(74) *Attorney, Agent, or Firm* — McClure, Qualey & Rodack, LLP

(57) ABSTRACT

A test/calibration system includes a device under test (DUT) and a calibrated device. The calibrated device is coupled to the DUT, transmits or receives a test signal to or from the DUT in response to a control signal for a test item to test, measure or calibrate functioning or performance of an internal component of the DUT.

17 Claims, 17 Drawing Sheets

(56) References Cited

U.S. PATENT DOCUMENTS

| | | | | |
|---|---|---|---|---|
| 8,362,796 | B2* | 1/2013 | Pagani | G01R 31/3172 324/762.02 |
| 8,415,955 | B2* | 4/2013 | Devine | G01R 19/145 324/500 |
| 9,000,788 | B2* | 4/2015 | Pagani | G01R 31/31713 324/750.3 |
| 2007/0232240 | A1 | 10/2007 | Wu et al. | |
| 2007/0297537 | A1 | 12/2007 | Luce | |
| 2009/0201039 | A1* | 8/2009 | Wu | G01R 31/3025 324/750.3 |
| 2010/0227574 | A1 | 9/2010 | Kuenen et al. | |
| 2013/0122825 | A1* | 5/2013 | Deforge | H04B 17/00 455/73 |
| 2014/0187170 | A1 | 7/2014 | Forstner | |
| 2016/0041221 | A1 | 2/2016 | Forstner | |

FOREIGN PATENT DOCUMENTS

| | | |
|---|---|---|
| CN | 101753227 | 6/2010 |
| CN | 101784904 | 7/2010 |
| CN | 102089669 | 6/2011 |
| CN | 102495353 | 6/2012 |
| CN | 102540052 | 7/2012 |
| DE | 102011086818 | 5/2012 |
| JP | 2008151718 | 7/2008 |
| TW | 201038956 | 11/2010 |
| WO | WO 2006/113460 | 10/2006 |
| WO | WO 2010/049853 | 5/2010 |

OTHER PUBLICATIONS

Kore, I., et al.; "Multi-Site Test of RF Transceivers on Low-Cost Digital ATE;" International Test Conference; IEEE; 2006; pp. 1-10.

* cited by examiner

LOW-COST TEST/CALIBRATION SYSTEM AND CALIBRATED DEVICE FOR LOW-COST TEST/CALIBRATION SYSTEM

CROSS REFERENCE TO RELATED APPLICATIONS

This application claims the benefit of U.S. Provisional Application No. 62/085,796, filed on Dec. 1, 2014. This application is also a Continuation-In-Part of application Ser. No. 14/696,807, filed on Apr. 27, 2015, which is a Continuation of U.S. patent application Ser. No. 14/054,213, filed on Oct. 15, 2013, which claims benefit of U.S. Provisional Application No. 61/731,845, filed on Nov. 30, 2012, and application Ser. No. 14/696,807 is also a Continuation-In-Part of U.S. patent application Ser. No. 13/480,969, filed on May. 25, 2012 (now U.S. Pat. No. 9,041,421), which claims the benefit of provisional Application No. 61/496,451, filed on Jun. 13, 2011, the entirety of which is incorporated by reference herein.

BACKGROUND OF THE INVENTION

Field of the Invention

The invention relates to a product test/calibration system and a calibrated device to perform a product test/calibration, and more particularly to a low-cost product test/calibration system and a low-cost calibrated device to perform the product test/calibration.

Description of the Related Art

Semiconductor devices are manufactured in the form of wafers comprising many thousands of devices. The wafers are diced into dies and packaged into integrated circuits (IC). Each IC has been implemented by integrating more and more digital and analog circuits into a single chip.

Due to the increasing complexity of the testing of integrated RF circuits, to identify "good" and "bad" ICs during production is a challenging problem for those conducting wafer-level tests or final tests. In addition, after the final test, the qualified ICs and some external components are fabricated further to produce a variety of electronic products. The manufacturers of electronic products have to further conduct the product test on the electronic products to make sure that all the components in the electronic products function well or have qualified performance.

Using conventional methods, to test electronic products using a dedicated standard or technology, a dedicated test instrument is required. The dedicated test instrument is usually very expensive. When an electronic product supports multiple standards or technologies, the cost increases enormously.

To solve this problem, a low-cost product test/calibration system is proposed.

BRIEF SUMMARY OF THE INVENTION

A test/calibration system and a low-cost calibrated device are provided. An exemplary embodiment of a test/calibration system comprising a device under test (DUT) and a calibrated device. The calibrated device is coupled to the DUT, transmits or receives a test signal to or from the DUT for a test item to test, measure or calibrate functioning or performance of an internal component of the DUT.

An exemplary embodiment of a calibrated device transmitting or receiving a test signal to or from a device under test (DUT) for a test item to test, measure or calibrate the functioning or performance of an internal component of the DUT, comprises at least one external component and at least one chip. The external component, outside of the chip, processes the received test signal from DUT for test result generation purpose, or receives a test pattern from the chip and processing the test pattern to generate the test signal to be transmitted to the DUT. The chip comprises at least one of an analog signal processing circuit and a baseband signal processing circuit, and comprises a memory device. The analog signal processing circuit processes an analog signal. The baseband signal processing circuit processes a baseband signal. The external component and/or the chip have been calibrated.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
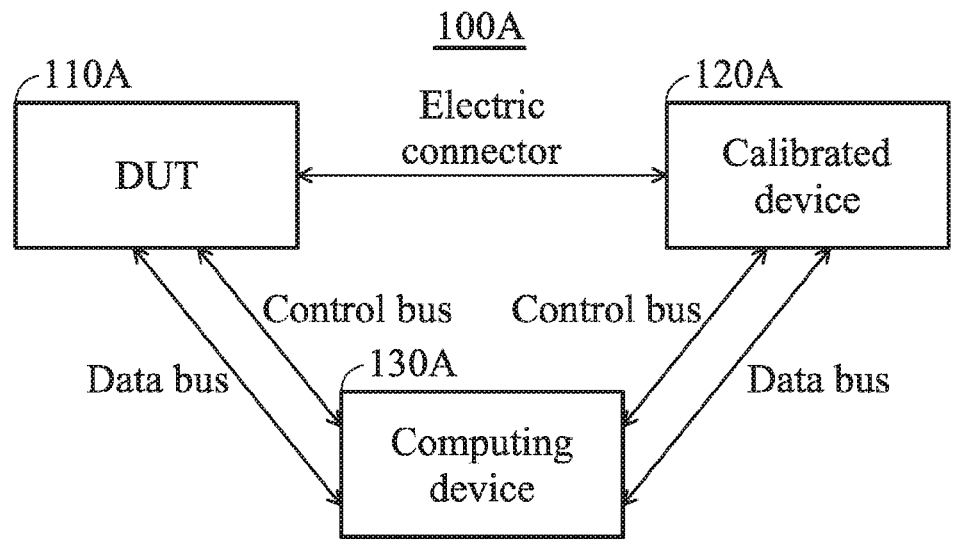
FIG. 1A is a block diagram of a low-cost product test/calibration system according to an embodiment of the invention.

FIG. 1A is a block diagram of a low-cost product test/calibration system according to an embodiment of the invention. According to an embodiment of the invention, the test/calibration system 100A may comprise a device under test (DUT) 110A, a calibrated device 120A, which is a well-calibrated electronic device that comprising one or more internal components that have been calibrated, and a computing device 130A. The DUT 110A may be an electronic device or a portable electronic device, such as a mobile phone, an access point, etc. The calibrated device 120A may also be an electronic device or a portable electronic device, such as a mobile device (e.g. phone, pad and wearable device), an access point, a test board (e.g. a Field-programmable gate array (FPGA), a PCI development card, a network card), etc. The computing device 130A may be a personal computer, a lap-top computer, a tablet, etc. The computing device 130A may be coupled to the DUT 110A and the calibrated device 120A via at least one control bus for transmitting/receiving one or more control signals and at least one data bus for transmitting/receiving data. In addition, in this embodiment, the DUT 110A may be coupled to the calibrated device 120A via an electric connector, e.g. radio frequency (RF) cable or RCA connector.

According to an embodiment of the invention, the computing device 130A may transmit one or more control signals to the DUT 110A and/or the calibrated device 120A to control a test flow of a test item to test the functioning or performance of an internal component of the DUT 110A, for example, to test whether the internal component of the DUT 110A functions normally, or to test whether the internal component have qualified performance. Please note that the test flow of the test item here may also indicate a measurement flow or calibration flow of the test item, for example, to measure the transmitting performance and/or receiving performance of the DUT 110A, or to calibrate the functions of the DUT 110A. Therefore, the term 'test flow' hereinafter stands for a test flow, a measurement flow and a calibration flow, and the term 'test item' stands for a test item, a measurement item and a calibration item. Upon receiving the control signal(s), the DUT 110A may prepare to transmit or receive one or more test signals to or from the calibrated device 120A, depending on which component of the DUT 110A is to be tested, to complete the test flow of a test item. Similarly, upon receiving the control signal(s), the calibrated device 120A may prepare to transmit or receive one or more test signals to or from the DUT 110A, depending on which component of the DUT 110A is to be test, to complete the test flow of a test item. Note that in the embodiments of the invention, the one or more test signals may be analog signal(s) or digital signal(s).

In addition, according to an embodiment of the invention, the calibrated device 120A may further process the test signal received from the DUT 110A, to obtain test data or a test pattern of a corresponding test item. The calibrated device 120A may further analyze the obtained test data or test pattern to obtain a test result regarding the test item, or alternatively, transmit the obtained test data or test pattern to the computing device 130A. The computing device 130A may analyze the received test data or test pattern to obtain a test result regarding the test item.

In addition, according to an embodiment of the invention, the DUT 110A may further process the test signal received from the calibrated device 120A, to obtain test data or a test pattern of a corresponding test item. The DUT 110A may further analyze the obtained test data or test pattern to obtain a test result regarding the test item, or alternatively, transmit the obtained test data or test pattern to the computing device 130A. The computing device 130A may analyze the received test data or test pattern to obtain a test result regarding the test item.

According to an embodiment of the invention, the test item may be (for exemplary purposes rather than as a limitation of the present invention) the TX (transmitting) spectrum mask/flatness/ACLR (Adjacent Channel Leakage Ratio) of the DUT 110A, the TX power measurement/calibration of the DUT 110A, the TX EVM (Error Vector Magnitude) of the DUT 110A, the TX frequency offset/calibration of the DUT 110A, the RX (receiving) sensitivity of the DUT 110A, etc.

For example, when testing the TX power of the DUT 110A, the computing device 130A may transmit one or more control signal(s) to instruct the DUT 110A to transmit a plurality of test signals to the calibrated device 120A. The computing device 130A may also transmit one or more control signal(s) to the calibrated device 120A to instruct the calibrated device 120A to receive the test signals. The calibrated device 120A may further compute the average power of the received test signals as the test data and analyze the test data to obtain the TX power test result, or compute the average power of the received test signals as the TX power test result. In some embodiments of the invention, the calibrated device 120A may also provide the test data to the computing device 130A for further data analysis at the computing device 130A to obtain the TX power test result. The TX power test result may indicate whether the TX power of the DUT 110A falls within a predetermined range, or indicate whether the DUT 110A passes the TX power test, or indicate how the DUT 110A should calibrate (higher/lower/remain) its TX power level. Note that in some embodiments of the invention, the calibrated device 120A may exclude the non-signal data when testing the TX power of the DUT 110A.

In another example, when testing the RX sensitivity of the DUT 110A, the computing device 130A may transmit one or more control signal(s) to instruct the calibrated device 120A to transmit a plurality of test signals with different power to the DUT 110A. The computing device 130A may also transmit one or more control signal(s) to the DUT 110A to instruct the DUT 110A to receive the test signals. The DUT 110A may collect its reception result regarding the reception of the test signals as the test data and provide the test data to the computing device 130A for further data analysis to obtain the RX sensitivity test result. In some embodiments of the invention, the DUT 110A may also analyze the test data to obtain the RX sensitivity test result.

Figure 1B:
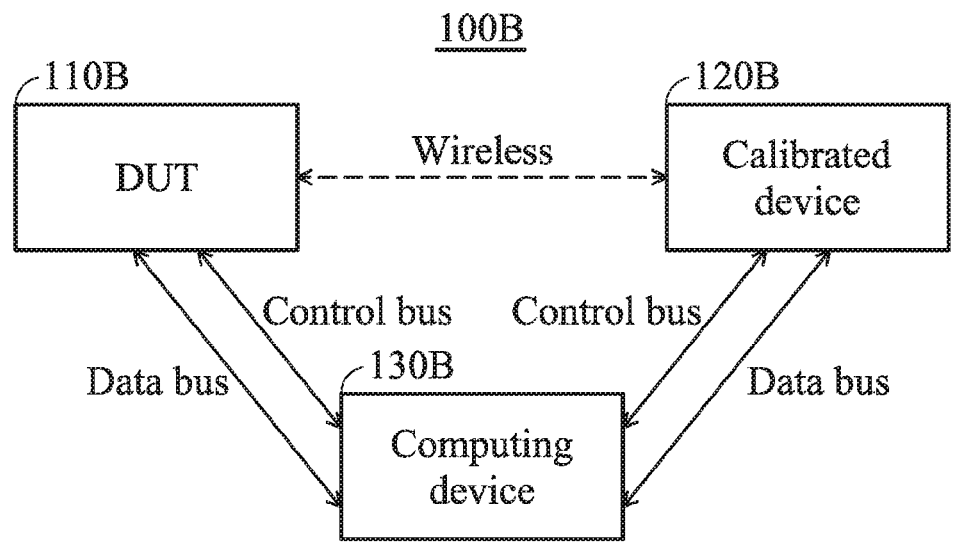
FIG. 1B is a block diagram of a low-cost product test/calibration system according to another embodiment of the invention.

FIG. 1B is a block diagram of a low-cost product test/calibration system according to another embodiment of the invention. Most of the elements shown in FIG. 1B are similar to FIG. 1A, and thus the descriptions are omitted here for brevity. In this embodiment, the DUT 110B may be coupled to the calibrated device 120B via a wireless radio link. In other words, the DUT 110B communicates with the calibrated device 120B by wireless medium.

Figure 1C:
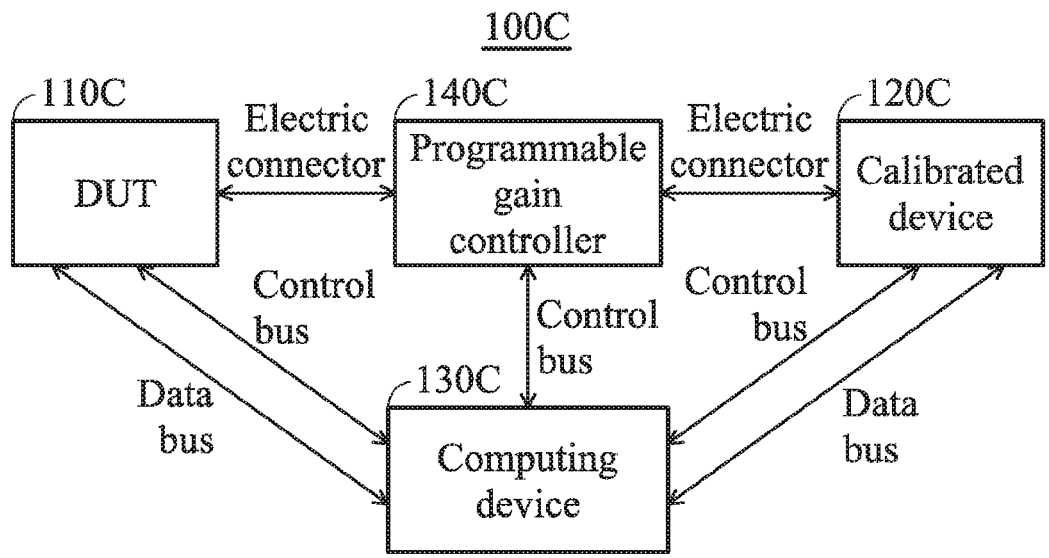
FIG. 1C is a block diagram of a low-cost product test/calibration system according to yet another embodiment of the invention.

FIG. 1C is a block diagram of a low-cost product test/calibration system according to yet another embodiment of the invention. Most of the elements shown in FIG. 1C are similar to FIG. 1A, and thus the descriptions are omitted here for brevity. In this embodiment, a programmable gain controller 140C may be disposed between the DUT 110C and the calibrated device 120C for amplifying or attenuating the test signal transmitted therebetween. The DUT 110C and the calibrated device 120C may be coupled to the programmable gain controller 340 via an electrical connector, e.g., RF connector or RCA connector. Note that in some embodiments of the invention, the programmable gain controller 340 may be replaced by, or further coupled to, a channel emulator which emulates a channel impulse response of a real channel, and the invention should not be limited thereto.

According to another aspect of the invention, the one or more control signals to control a test flow of a test item may also be generated by the DUT or the calibrated device, instead of the computing device. In this aspect of invention, the computing device may only transmit and/or receive data to or from the DUT and/or the calibrated device.

Figure 2A:
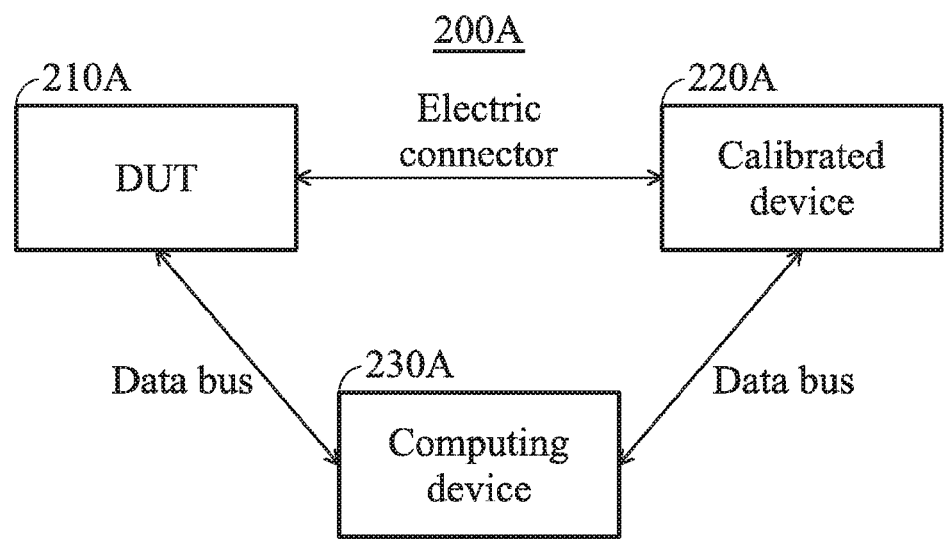
FIG. 2A is a block diagram of a low-cost product test/calibration system according to yet another embodiment of the invention.

FIG. 2A is a block diagram of a low-cost product test/calibration system according to yet another embodiment of the invention. Most of the elements shown in FIG. 2A are similar to FIG. 1A, and thus the descriptions are omitted here for brevity. In this embodiment, the computing device 230A may be coupled to the DUT 210A and the calibrated device 220A via at least one data bus for transmitting/receiving data.

Figure 2B:
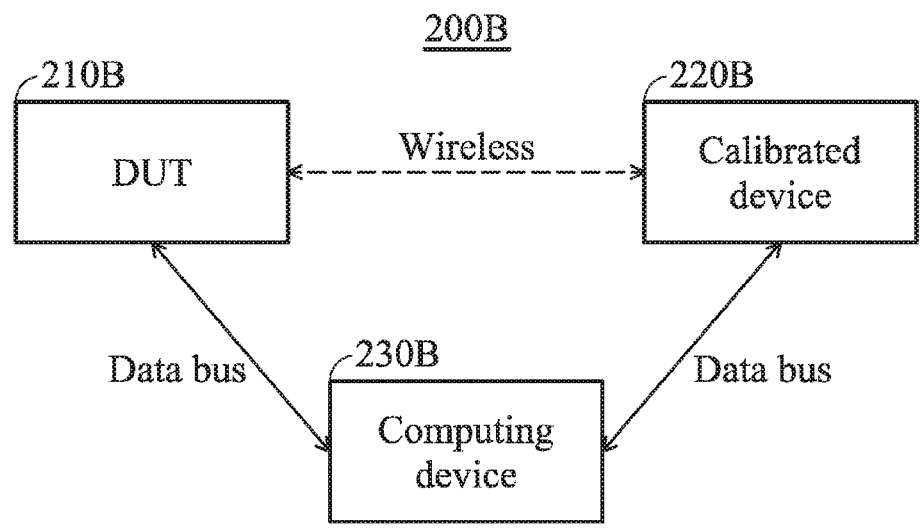
FIG. 2B is a block diagram of a low-cost product test/calibration system according to yet another embodiment of the invention.

FIG. 2B is a block diagram of a low-cost product test/calibration system according to yet another embodiment of the invention. Most of the elements shown in FIG. 2B are similar to FIG. 1B, and thus the descriptions are omitted here for brevity. In this embodiment, the computing device 230B may be coupled to the DUT 210B and the calibrated device 220B via at least one data bus for transmitting/receiving data.

Figure 2C:
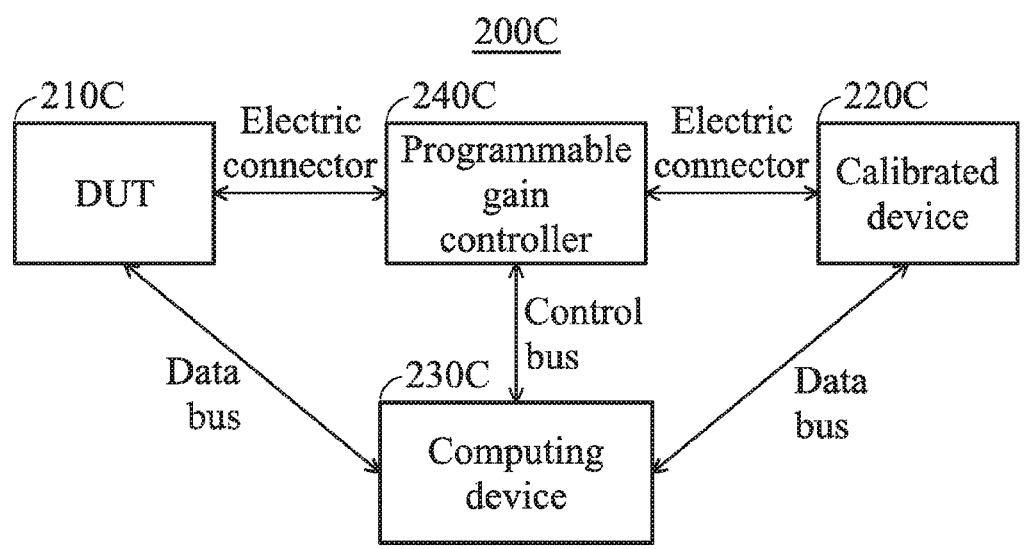
FIG. 2C is a block diagram of a low-cost product test/calibration system according to yet another embodiment of the invention.

FIG. 2C is a block diagram of a low-cost product test/calibration system according to yet another embodiment of the invention. Most of the elements shown in FIG. 2C are similar to FIG. 1C, and thus the descriptions are omitted here for brevity. In this embodiment, the computing device 230C may be coupled to the DUT 210C and the calibrated device 220C via at least one data bus for transmitting/receiving data.

According to yet another aspect of the invention, the test/calibration system may comprise only the DUT and the calibrated device. In this aspect of invention, the one or more control signals to control a test flow of a test item may also be generated by the DUT or the calibrated device, and the test data or test pattern may be provided, generated, and analyzed by the DUT or the calibrated device.

Figure 3A:
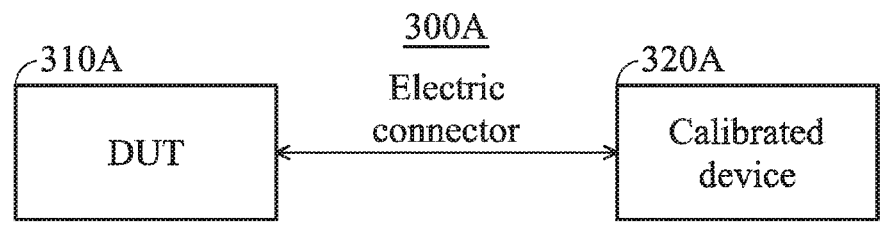
FIG. 3A is a block diagram of a low-cost product test/calibration system according to yet another embodiment of the invention.

FIG. 3A is a block diagram of a low-cost product test/calibration system according to yet another embodiment of the invention. Most of the elements shown in FIG. 3A are similar to FIG. 1A, and thus the descriptions are omitted here for brevity. In this embodiment, the system 300A may comprise only the DUT 310A and the calibrated device 320A.

Figure 3B:
FIG. 3B is a block diagram of a low-cost product test/calibration system according to yet another embodiment of the invention.

FIG. 3B is a block diagram of a low-cost product test/calibration system according to yet another embodiment of the invention. Most of the elements shown in FIG. 3B are similar to FIG. 1B, and thus the descriptions are omitted here for brevity. In this embodiment, the system 300B may comprise only the DUT 310B and the calibrated device 320B.

Figure 3C:
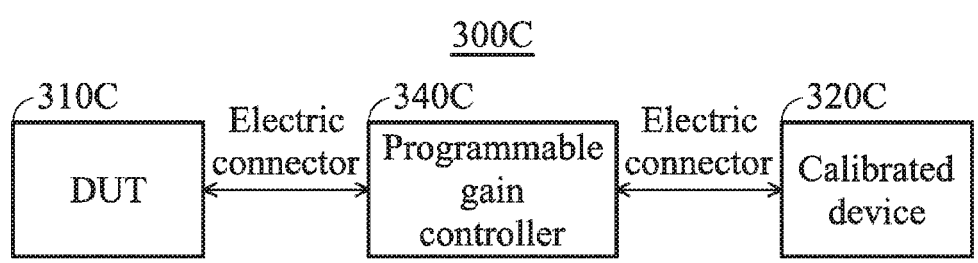
FIG. 3C is a block diagram of a low-cost product test/calibration system according to yet another embodiment of the invention.

FIG. 3C is a block diagram of a low-cost product test/calibration system according to yet another embodiment of the invention. Most of the elements shown in FIG. 3C are similar to FIG. 1C, and thus the descriptions are omitted here for brevity. In this embodiment, the system 300C may comprise only the DUT 310C, the calibrated device 320C and the programmable gain controller 340C.

According to yet another aspect of the invention, the one or more control signals to control a test flow of a test item may be generated by the computing device. In this aspect of invention, the test data or test pattern may be provided, generated, and analyzed by the DUT or the calibrated device, instead of the computing device.

Figure 4A:
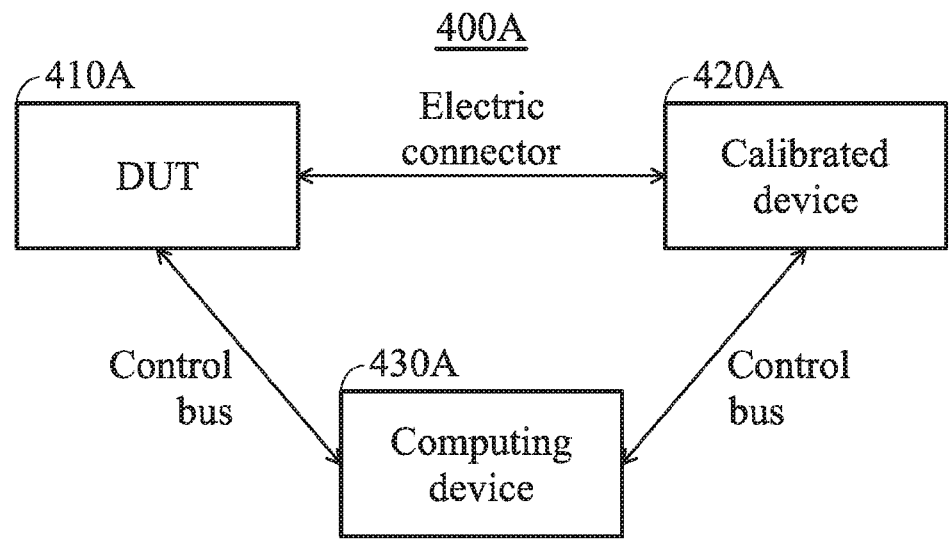
FIG. 4A is a block diagram of a low-cost product test/calibration system according to yet another embodiment of the invention.

FIG. 4A is a block diagram of a low-cost product test/calibration system according to yet another embodiment of the invention. Most of the elements shown in FIG. 4A are similar to FIG. 1A, and thus the descriptions are omitted here for brevity. In this embodiment, the computing device 430A may be coupled to the DUT 410A and the calibrated device 420A via at least one control bus for transmitting/receiving one or more control signals.

Figure 4B:
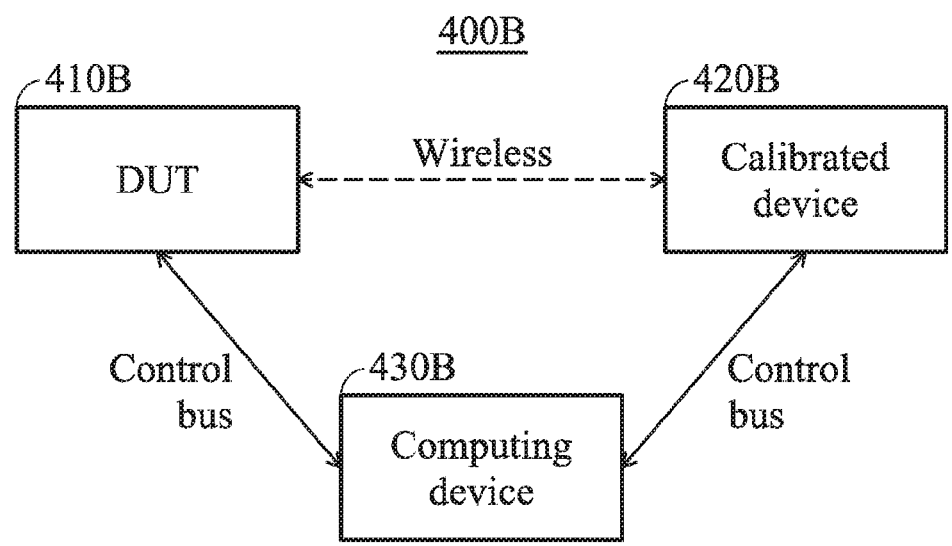
FIG. 4B is a block diagram of a low-cost product test/calibration system according to yet another embodiment of the invention.

FIG. 4B is a block diagram of a low-cost product test/calibration system according to yet another embodiment of the invention. Most of the elements shown in FIG. 4B are similar to FIG. 1B, and thus the descriptions are omitted here for brevity. In this embodiment, the computing device 430B may be coupled to the DUT 410B and the calibrated device 420B via at least one control bus for transmitting/receiving one or more control signals.

Figure 4C:
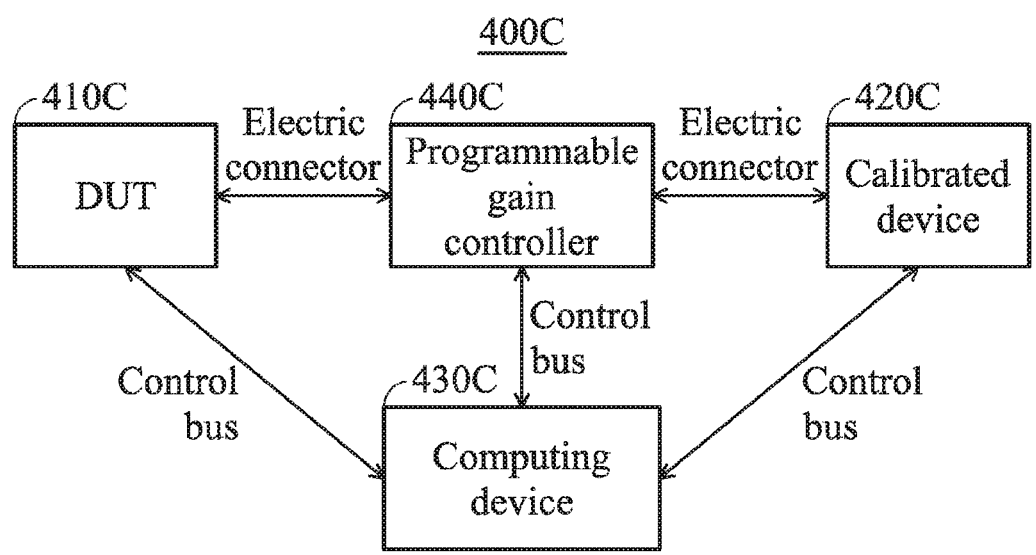
FIG. 4C is a block diagram of a low-cost product test/calibration system according to yet another embodiment of the invention.

FIG. 4C is a block diagram of a low-cost product test/calibration system according to yet another embodiment of the invention. Most of the elements shown in FIG. 4C are similar to FIG. 1C, and thus the descriptions are omitted here for brevity. In this embodiment, the computing device 430C may be coupled to the DUT 410C and the calibrated device 420C via at least one control bus for transmitting/receiving one or more control signals.

As shown in FIG. 1A-1C to FIG. 4A-4C, in the embodiments of the invention, instead of using an expensive instrument, a calibrated device is used to perform the product test. In some embodiments of the invention, the calibrated device may be the same kind of device or product as the DUT. In some embodiments of the invention, the calibrated device may be a similar kind of device or product as the DUT but with some different functions. In some embodiments of the invention, the DUT is a mobile phone to be tested and the calibrated device is a pre-calibrated mobile phone. The functions of the calibrated mobile phone (calibrated device) related to the test items, such as transmitting capability and receiving capability, are pre-calibrated to a certain level that are precise enough for performing the product test. Therefore, compared to the conventional design, which use an expensive instrument that has been over-designed specifically for testing a dedicated standard or technology, in the proposed test/calibration system, the cost for performing product test can be greatly reduced.

Figure 5:
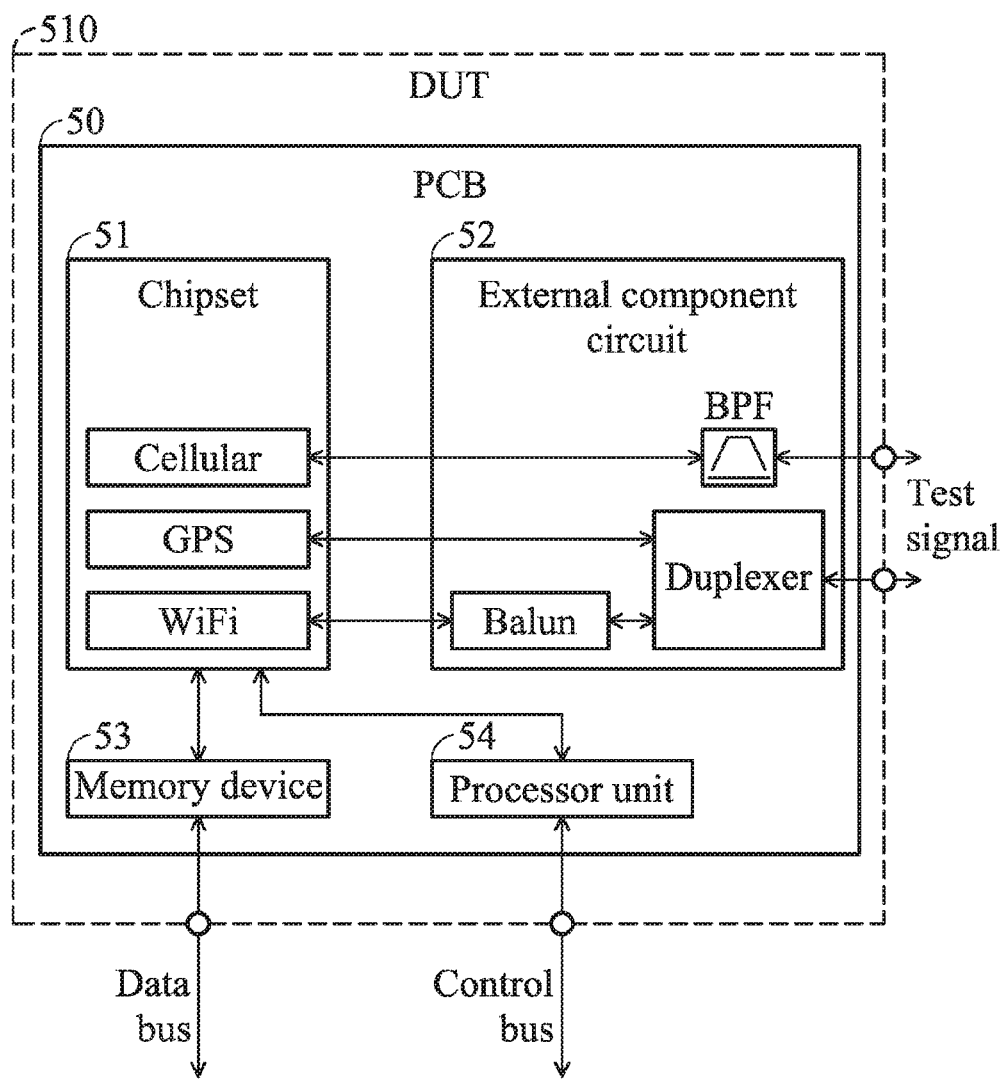
FIG. 5 shows an exemplary block diagram of a DUT according to an embodiment of the invention.

FIG. 5 shows an exemplary block diagram of a DUT according to an embodiment of the invention. The DUT 510 may comprise a chipset 51, an external component circuit 52, a memory device 53 and a processor unit 54 disposed on a printed circuit board (PCB) 50. The chipset 51 may comprise one or more chips. The chip may be a digital chip, an analog chip, or a system on chip (SoC). According to an embodiment of the invention, the chipset 51 may comprise a cellular chip providing cellular communications services in compliance with a specific cellular communications standard (such as GSM, 3G, LTE, . . . etc), a GPS chip providing GPS communications services in compliance with GPS standard, a WiFi chip providing WiFi communications services in compliance with WiFi standard, etc. The external component circuit 52 may comprise one or more external RF or analog components external to the chips. According to an embodiment of the invention, the external component circuit 52 may comprise a bandpass filter (BPF), a balance-unbalance (Balun), a duplexer, etc. Note that the components comprised in the DUT 510 as shown in FIG. 5 are for illustrative purposes and are not intended to be a limitation of the present invention. As will be readily appreciated, a DUT can be any electronic device or product and may comprise one or more of the same or different components, as shown in FIG. 5. Therefore, the invention should not be limited thereto.

Figure 6A:
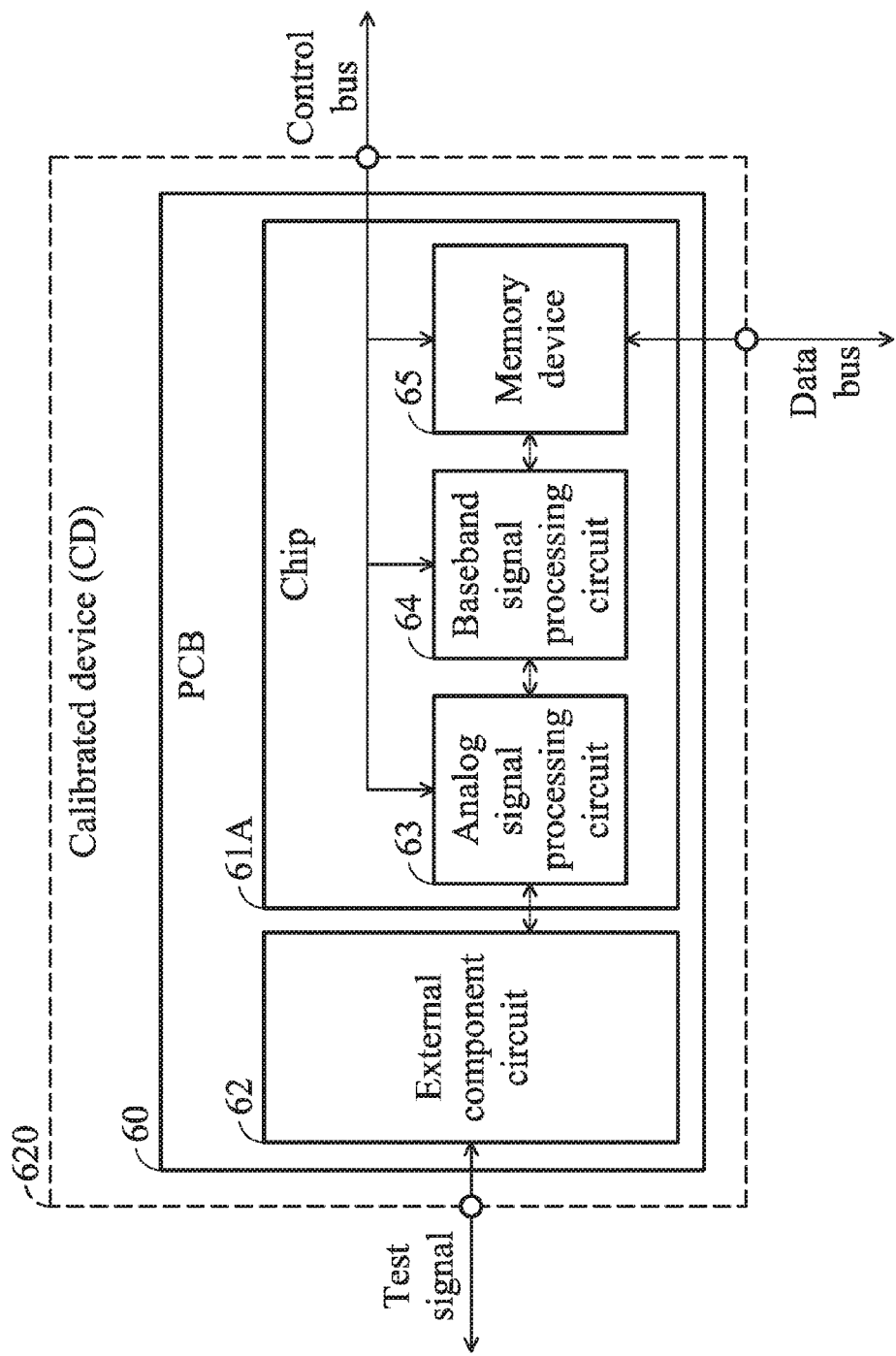
FIG. 6A shows an exemplary block diagram of a calibrated device according to an embodiment of the invention.

FIG. 6A shows an exemplary block diagram of a calibrated device according to an embodiment of the invention. The calibrated device 620 may comprise at least one chip 61A and an external component circuit 62 disposed on a printed circuit board (PCB) 60. According to an embodiment of the invention, the chip 61A may be a digital chip, an analog chip, or a system on chip (SoC), and may provide communications services in compliance with a specific standard (for example, a specific cellular standard, the GPS standard, the WiFi standard as illustrated above, etc). The chip 61A may comprise an analog signal processing circuit 63 (such as an RF signal processing circuit), a baseband signal processing circuit 64 and a memory device 65. The external component circuit 62 may comprise one or more external components, such as external RF component and/or analog components configured outside of the chip 61A.

As illustrated above, in the embodiments of the invention, the DUT may generate a test pattern or test data and transmit one or more test signals comprising the test data or pattern to the calibrated device in response to a control signal. The test signal may be analog or digital signal. The calibrated device may receive the test signal(s) in response to a control signal and may process the test signal(s) further to obtain the test pattern or test data.

On the other hand, in the embodiments of the invention, the calibrated device may also generate a test data or pattern and transmit one or more test signals comprising the test data or pattern to the DUT in response to a control signal. The test signal may be analog or digital signal. The DUT may receive the test signal(s) in response to a control signal and may further process or further analyze the received test signal(s) to obtain the test pattern, test data or further the test result.

To be more specific, according to an embodiment of the invention, the external component circuit 62 may process the received test signal for test result generation, or receive a test data or pattern from the chip 61A and process the test data or pattern to generate the test signal to be transmitted to the DUT. According to an embodiment of the invention, the external component(s) comprised in the external component circuit 62 may process one or more test signal(s) received from the DUT to generate one or more RF signal(s) for the following analog signal processing circuit 63, or may receive one or more RF signal(s) from the analog signal processing circuit 63 and process the RF signal(s) to generate one or more test signal(s) to be transmitted to the DUT. According to an embodiment of the invention, the external component comprised in the external component circuit 52 may be analog circuits for signal processing, such as a power amplifier, a filter, a balance-unbalance (Balun), a duplexer, etc. Please note that, in some embodiments, rather than generating/processing RF signal(s), the external component circuit 62 may generate one or more intermediate frequency (IF) signal(s) or low-intermediate frequency (low-IF) signal (s) for the following analog processing circuit 63, or may receive one or more IF signal(s) or low-IF signal(s) from the analog signal processing circuit 63 and process the IF signal(s) or low-IF signal(s) to generate one or more test signal(s), depending on the system requirements or system configurations.

The analog signal processing circuit 63 may process the one or more RF signal(s) received from the external component circuit 62 and may then frequency down-convert the one or more RF signal(s) to generate one or more baseband signal(s), or may receive one or more baseband signal(s) to be transmitted to the DUT from the baseband signal processing circuit 64, frequency up-convert the one or more baseband signal(s) to generate one or more RF signal(s), and may further process one or more RF signal(s) before being provided to the external component circuit 62. According to an embodiment of the invention, the analog signal processing circuit 63 may comprise a plurality of devices to perform radio frequency conversion and RF signal processing. For example, the analog signal processing circuit 63 may comprise a mixer to multiply the baseband signal with a carrier oscillated in a desired radio frequency. Please note that, rather than performing RF conversion, the analog signal processing circuit 63 may perform intermediate frequency (IF) conversion or low-intermediate frequency (low-IF) conversion in some embodiments, depending on the system requirements or system configurations.

The baseband signal processing circuit 64 may process the one or more baseband signals received from the analog signal processing circuit 63, or may generate a test pattern or test data to be transmitted to the DUT and may further process the baseband signal(s) comprising the test pattern or test data before being provided to the analog signal processing circuit 63. According to an embodiment of the invention, the baseband signal processing circuit 64 may comprise a plurality of devices to perform baseband signal processing. The baseband signal processing may comprise analog to digital conversion (ADC)/digital to analog conversion (DAC), gain adjustments, modulation/demodulation, encoding/decoding, and so on.

According to an embodiment of the invention, the test pattern or test data may be obtained or captured from the received test signal, the RF/IF/low-IF signal or the baseband signal. The test pattern or test data may be stored in the memory device 65 and analyzed by the calibrated device to obtain a test result regarding the test item, or may be stored in the memory device 65 and transmitted to the computing device (e.g. 130A-C, 230A-C, 430A-C) for the computing device to analyze the test data to obtain a test result regarding the test item.

Note that in some embodiments of the invention, a processor unit may be comprised in the baseband signal processing circuit 64, and in some embodiments of the invention, a processor unit may be an independent device disposed outside of the baseband signal processing circuit 64, and the invention should not be limited to any specific implementation method.

Note further that the components comprised in the calibrated device 620 as shown in FIG. 6A are for illustrative purpose rather than a limitation of the present invention. As will be readily appreciated by those who are skilled in this technology, a calibrated device can be any electronic device or product and may comprise one or more of the same or different components, as shown in FIG. 6A. Therefore, the invention should not be limited thereto.

In addition, note further that, as will be readily appreciated by those who are skilled in this technology, the chip(s) in the chipset 51 of the DUT 510 shown in FIG. 5 may also comprise a corresponding analog signal processing circuit, baseband signal processing circuit, processor unit, and/or memory device, and each component may function or operate in a similar way for its corresponding signal processing, similar to the embodiments illustrated above. Therefore, the detailed descriptions are omitted here for brevity.

Figure 6B:
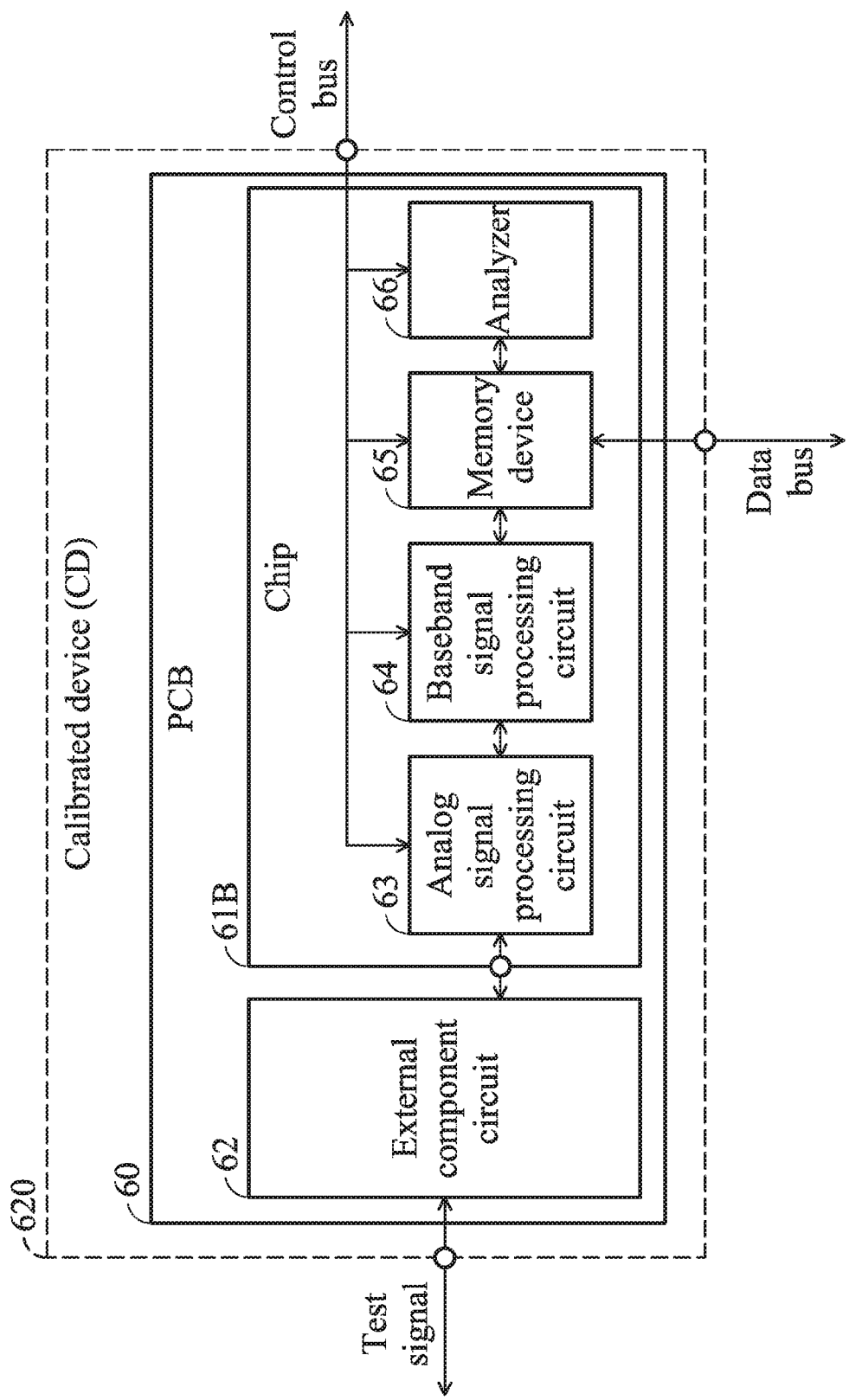
FIG. 6B shows another exemplary block diagram of a calibrated device according to another embodiment of the invention.

FIG. 6B shows another exemplary block diagram of a calibrated device according to another embodiment of the invention. Most of the elements shown in FIG. 6B are similar to FIG. 6A, and thus the descriptions are omitted here for brevity. In this embodiment, the chip 61B of the calibrated device 620 may further comprise an analyzer 66 for analyzing the captured test pattern or test data to obtain a test result corresponding to a test item. According to an embodiment of the invention, the analyzer 66 may be implemented by hardware device(s) or a software module, and the invention should not be limited to any specific implementation method.

Figure 6C:
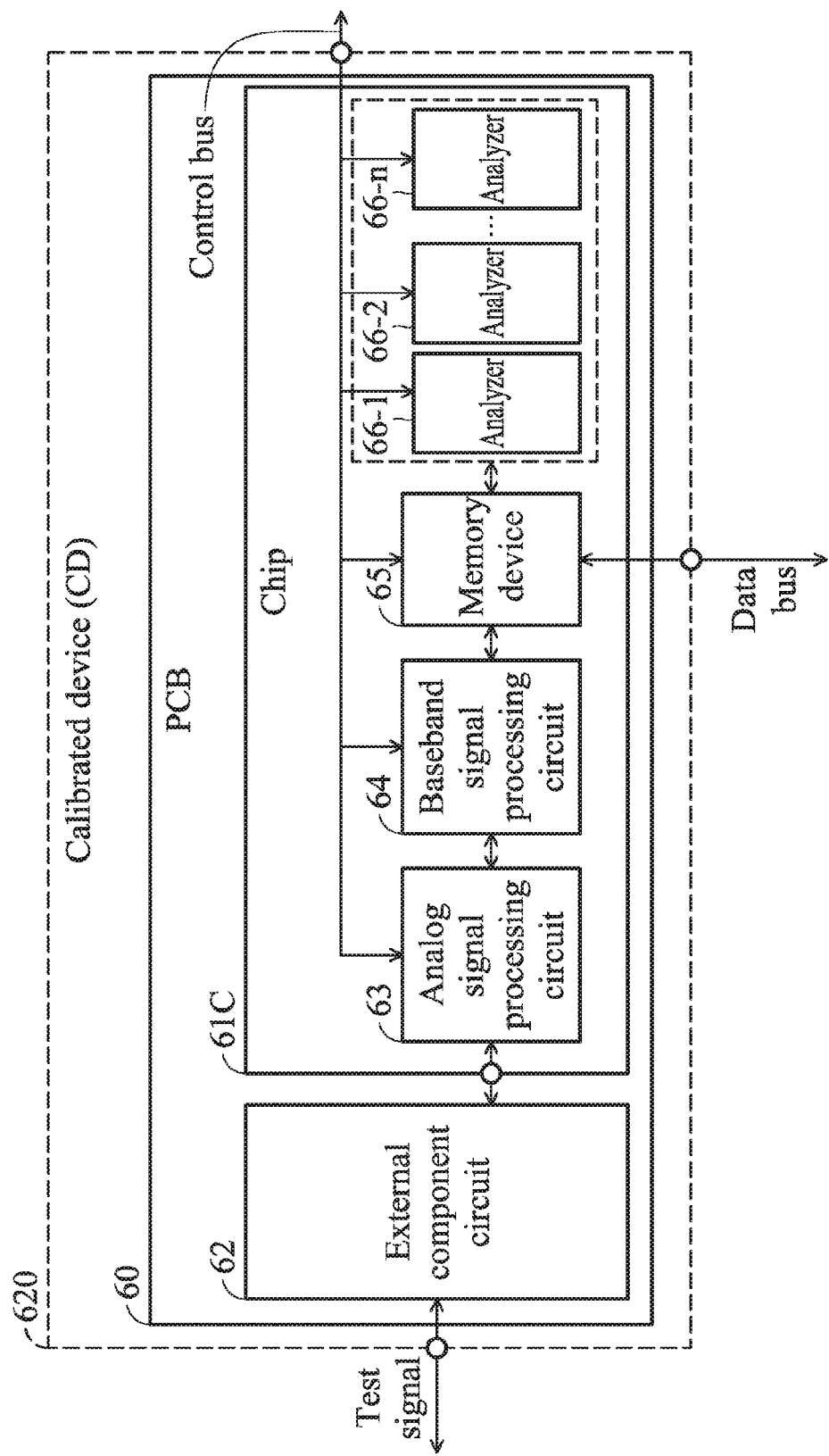
FIG. 6C shows another exemplary block diagram of a calibrated device according to yet another embodiment of the invention.

FIG. 6C shows another exemplary block diagram of a calibrated device according to yet another embodiment of the invention. Most of the elements shown in FIG. 6C are similar to FIG. 6A, and thus the descriptions are omitted here for brevity. In this embodiment, the chip 61C of the calibrated device 620 may further comprise a plurality of analyzers 66-1, 66-2 . . . 66-n, where n is a positive integer. According to an embodiment of the invention, the plurality of analyzers 66-1, 66-2 . . . 66-n are capable of analyzing the test data concurrently. According to another embodiment of the invention, each analyzer may be designed for analyzing the captured test pattern or test data to obtain a test result corresponding to a test item. For example, the analyzer 66-1 may be designed for analyzing the captured test pattern or test data to obtain a test result corresponding to a first test item, the analyzer 66-2 may be designed for analyzing the captured test pattern or test data to obtain a test result corresponding to a second test item, and so on.

According to an embodiment of the invention, the analyzers 66-1, 66-2 . . . 66-n may be implemented by hardware device(s) or a software module, and the invention should not be limited to any specific implementation method. In addition, according to an embodiment of the invention, the analyzers 66-1, 66-2 . . . 66-n are capable of analyzing the test pattern or test data of different test items at the same time. Since the analyzers can operate in parallel along the time domain, the test speed can be greatly improved.

Figure 7A:
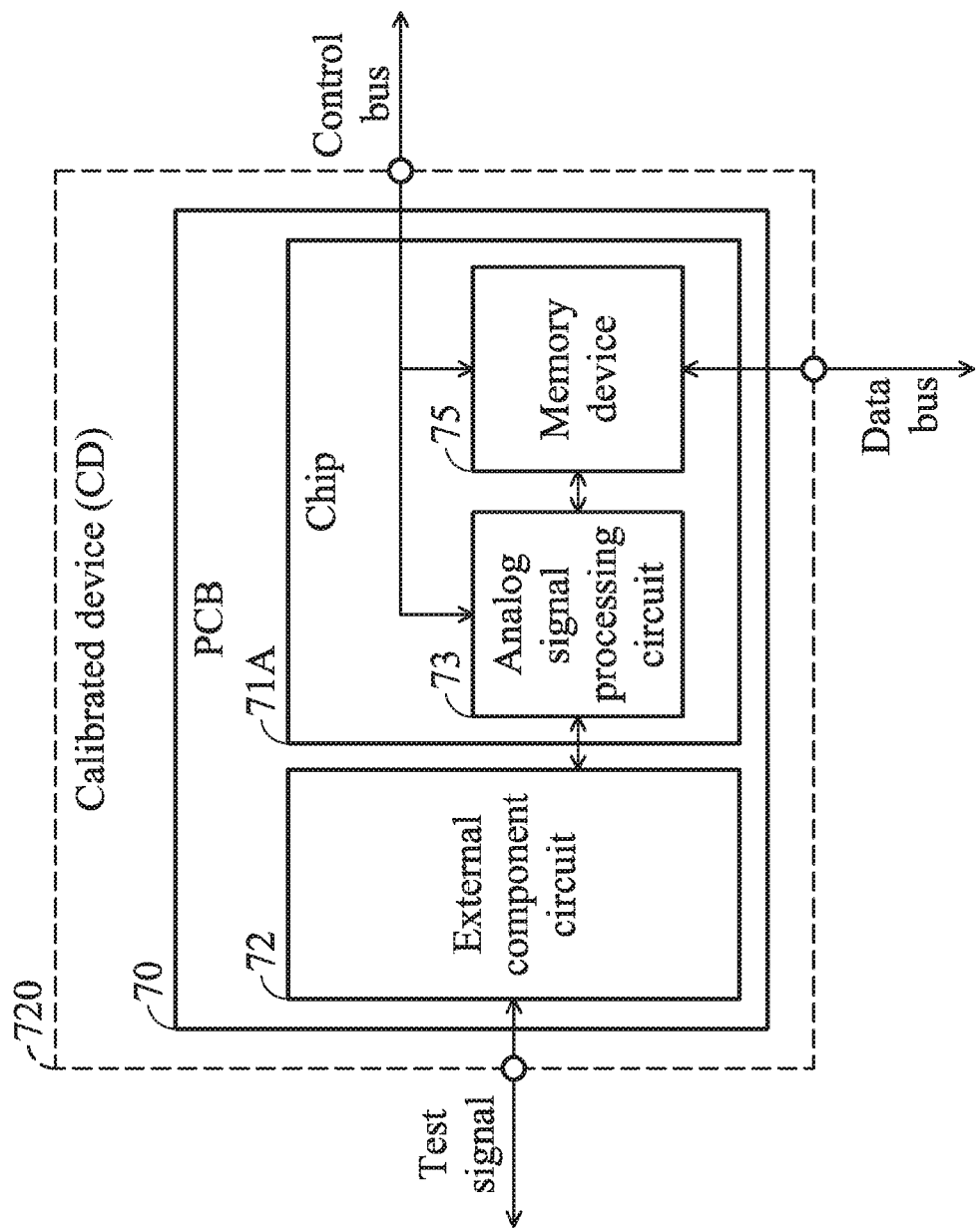
FIG. 7A shows another exemplary block diagram of a calibrated device according to yet another embodiment of the invention.

FIG. 7A shows another exemplary block diagram of a calibrated device according to yet another embodiment of the invention. Most of the elements shown in FIG. 7A are similar to FIG. 6A, and thus the descriptions are omitted here for brevity. In this embodiment, the chip 71A may comprise an analog signal processing circuit 73 and a memory device 75.

In this embodiment, baseband signal processing may be implemented by devices (e.g. ADC with software) outside the calibrated device and not necessary to be implemented inside the calibrated device. The external component circuit may process one or more test signal(s) received from the DUT to generate one or more RF signal(s) for the following analog signal processing circuit 73, or may receive one or more RF signal(s) from the analog signal processing circuit 73 and process the RF signal(s) to generate one or more test signal(s) to be transmitted to the DUT. The RF signal(s) may be stored in the memory device 75 and may also be transmitted to the computing device. Please note that, rather than performing RF conversion, the analog signal processing circuit 63 may perform intermediate frequency (IF) conversion or low-intermediate frequency (low-IF) conversion in some embodiments, depending on the system requirements or system configurations.

Figure 7B:
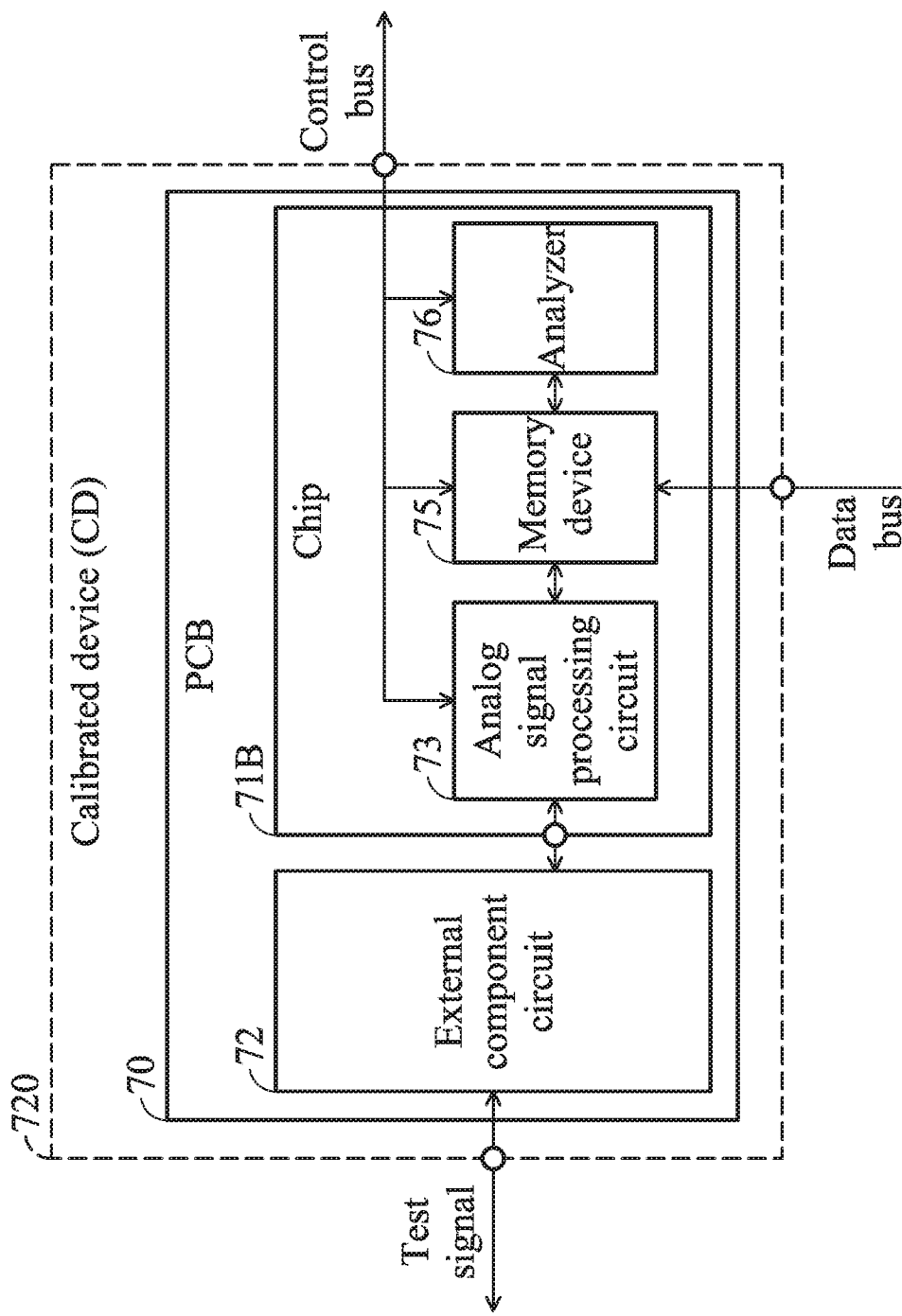
FIG. 7B shows another exemplary block diagram of a calibrated device according to yet another embodiment of the invention.

FIG. 7B shows another exemplary block diagram of a calibrated device according to yet another embodiment of the invention. Most of the elements shown in FIG. 7B are similar to FIG. 6B and FIG. 7A, and thus the descriptions are omitted here for brevity. In this embodiment, the chip 71B may comprise an analog signal processing circuit 73, a memory device 75 and an analyzer 76.

Figure 7C:
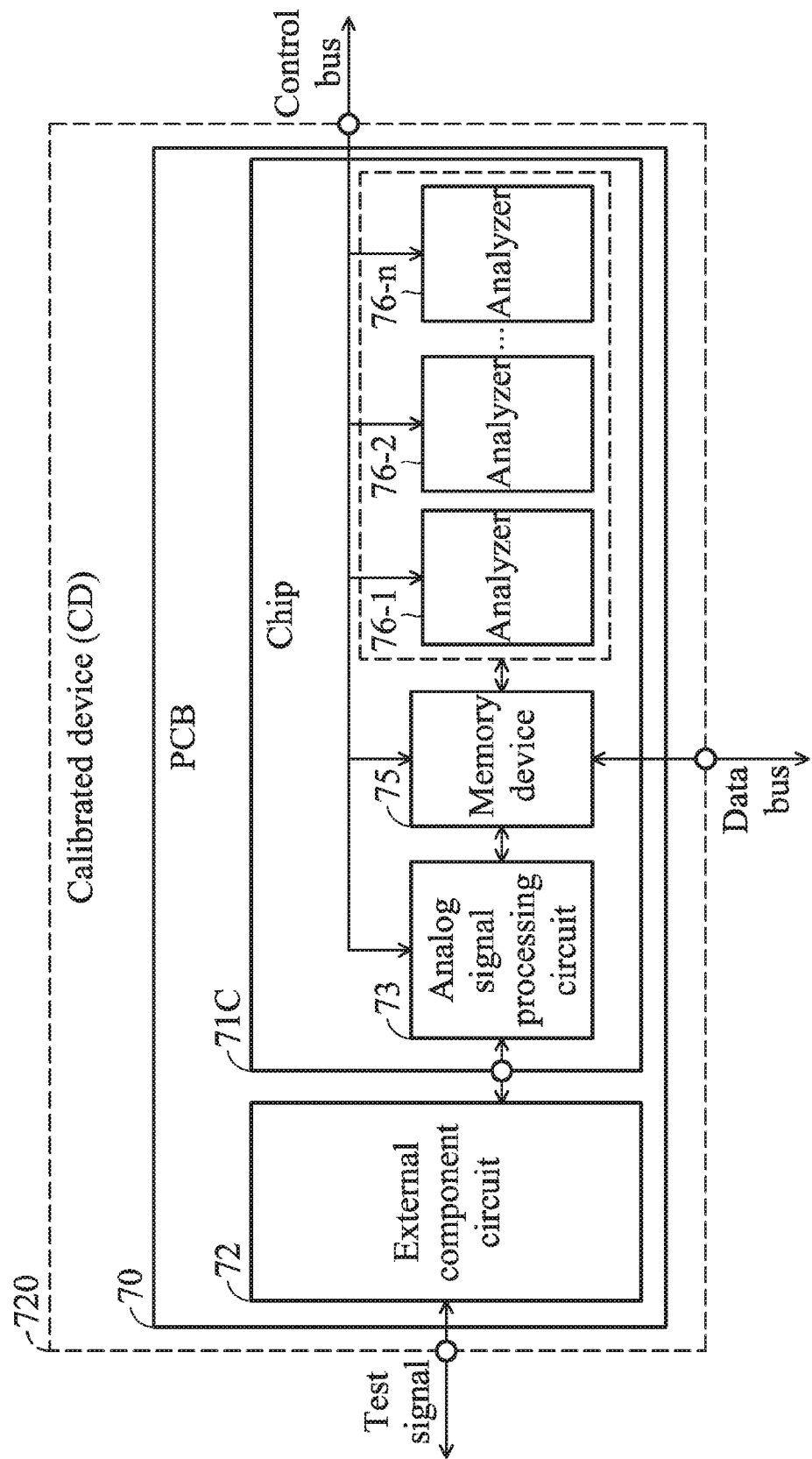
FIG. 7C shows another exemplary block diagram of a calibrated device according to yet another embodiment of the invention.

FIG. 7C shows another exemplary block diagram of a calibrated device according to yet another embodiment of the invention. Most of the elements shown in FIG. 7C are similar to FIG. 6C and FIG. 7A, and thus the descriptions are omitted here for brevity. In this embodiment, the chip 71C may comprise an analog signal processing circuit 73, a memory device 75 and a plurality of analyzers 76-1, 76-2 . . . 76-n capable of analyzing the test data concurrently, where n is a positive integer.

Figure 8A:
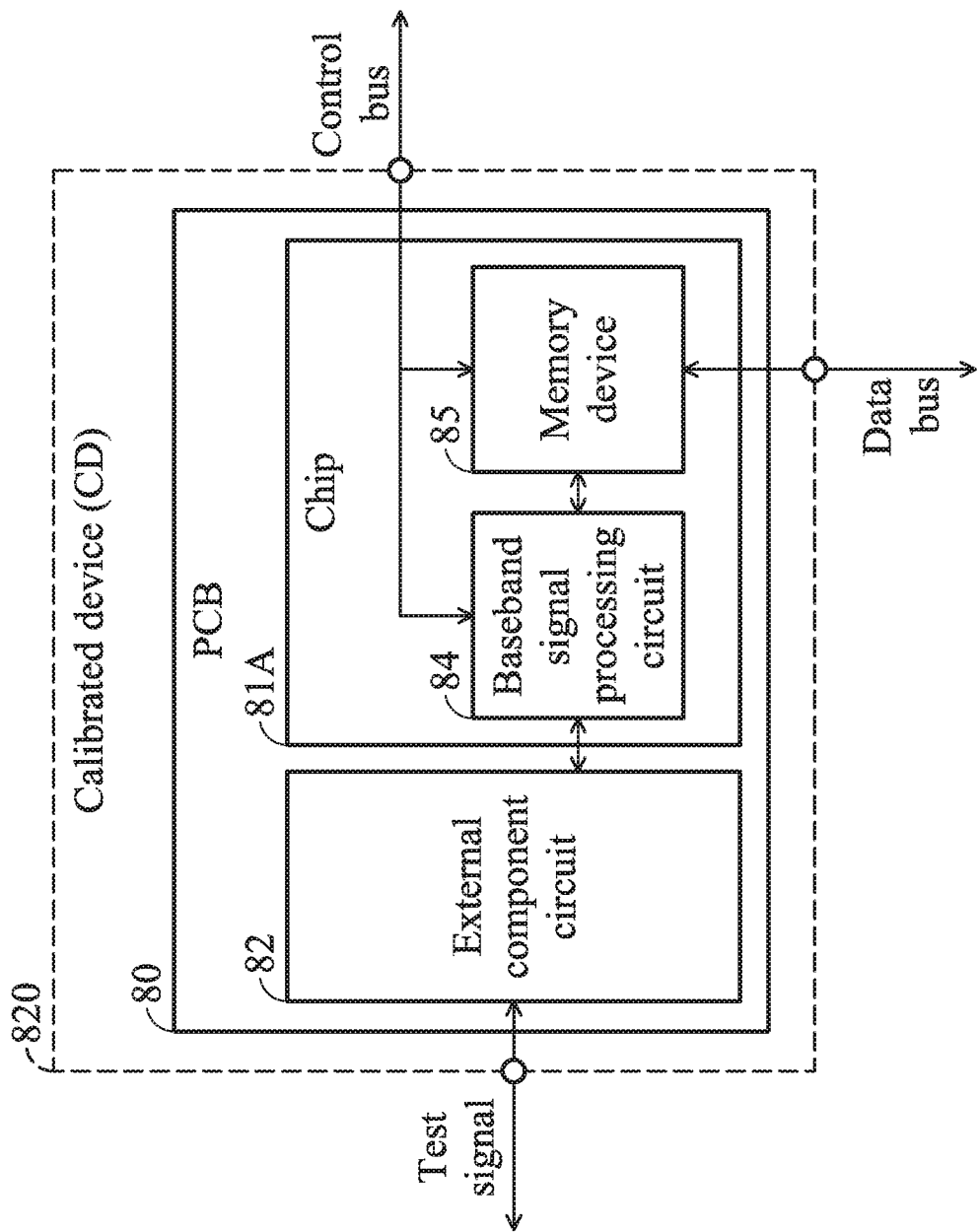
FIG. 8A shows another exemplary block diagram of a calibrated device according to yet another embodiment of the invention.

FIG. 8A shows another exemplary block diagram of a calibrated device according to yet another embodiment of the invention. Most of the elements shown in FIG. 8A are similar to FIG. 6A, and thus the descriptions are omitted here for brevity. In this embodiment, the chip 81A may comprise a baseband processing circuit 84 coupled to the external component circuit 82 and a memory device 85.

In this embodiment, the test signal(s) may be in digital format (for example, from Mictor probes), and the external component circuit may be an impedance matching circuit, and may process one or more test signal(s) received from the DUT to generate one or more baseband signal(s) for the following baseband signal processing circuit 84, or may receive one or more baseband signal(s) from the baseband signal processing circuit 84 and process the baseband signal(s) to generate one or more test signal(s) to be transmitted to the DUT. The baseband signal(s) may be stored in the memory device 85 and may also be transmitted to the computing device.

Note that in other embodiments of the invention, the external component circuit may also process one or more test signal(s) received from the DUT to generate one or more processed signal(s) and store the processed signal(s) in the memory device 85, or may receive the test data or pattern from the memory device 85 and process the test data or pattern to generate one or more test signal(s) to be transmitted to the DUT. The processed signal(s) stored in the memory device 85 may also be transmitted to the computing device.

Figure 8B:
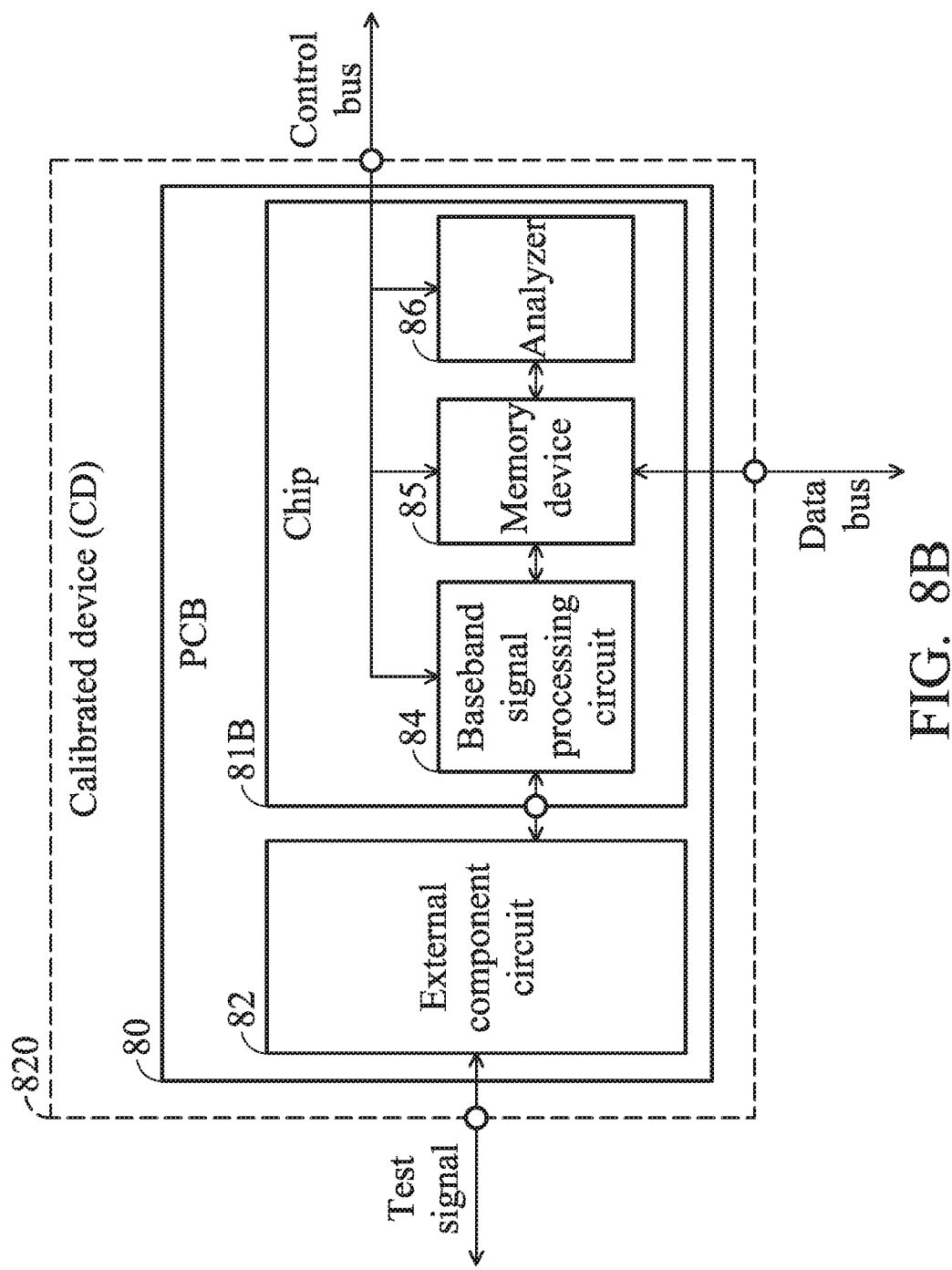
FIG. 8B shows another exemplary block diagram of a calibrated device according to yet another embodiment of the invention.

FIG. 8B shows another exemplary block diagram of a calibrated device according to yet another embodiment of the invention. Most of the elements shown in FIG. 8B are similar to FIG. 6B and FIG. 8A, and thus the descriptions are omitted here for brevity. In this embodiment, the chip 81B may comprise a baseband processing circuit 84 coupled to the external component circuit 82, a memory device 85 and an analyzer 86.

Figure 8C:
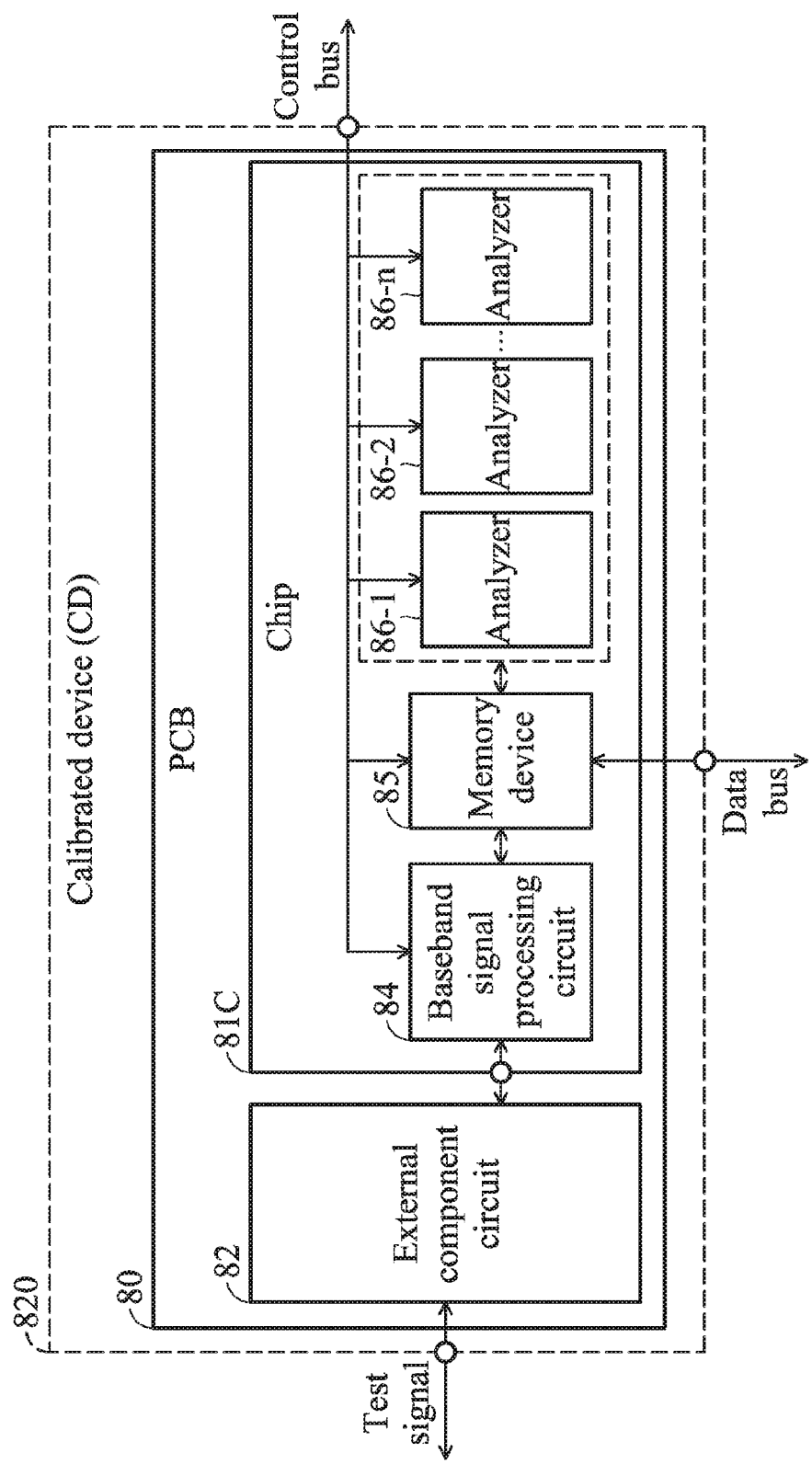
FIG. 8C shows another exemplary block diagram of a calibrated device according to yet another embodiment of the invention.

FIG. 8C shows another exemplary block diagram of a calibrated device according to yet another embodiment of the invention. Most of the elements shown in FIG. 8C are similar to FIG. 6C and FIG. 8A, and thus the descriptions are omitted here for brevity. In this embodiment, the chip 81C may comprise a baseband processing circuit 84 coupled to the external component circuit 82, a memory device 85 and a plurality of analyzers 86-1, 86-2 . . . 86-n capable of analyzing the test data concurrently, where n is a positive integer As discussed above, the calibrated device may be the same kind of device or product as the DUT, or may be a similar kind of device or product as the DUT but with some different functions, as long as the components comprised therein have been well-calibrated in advanced. According to an embodiment of the invention, the calibrated device may be implemented by a calibrated mobile device, a calibrated access point, a calibrated test board, etc. Following illustrate an example of generating a calibrated device for the above-mentioned test/calibration systems.

Figure 9:
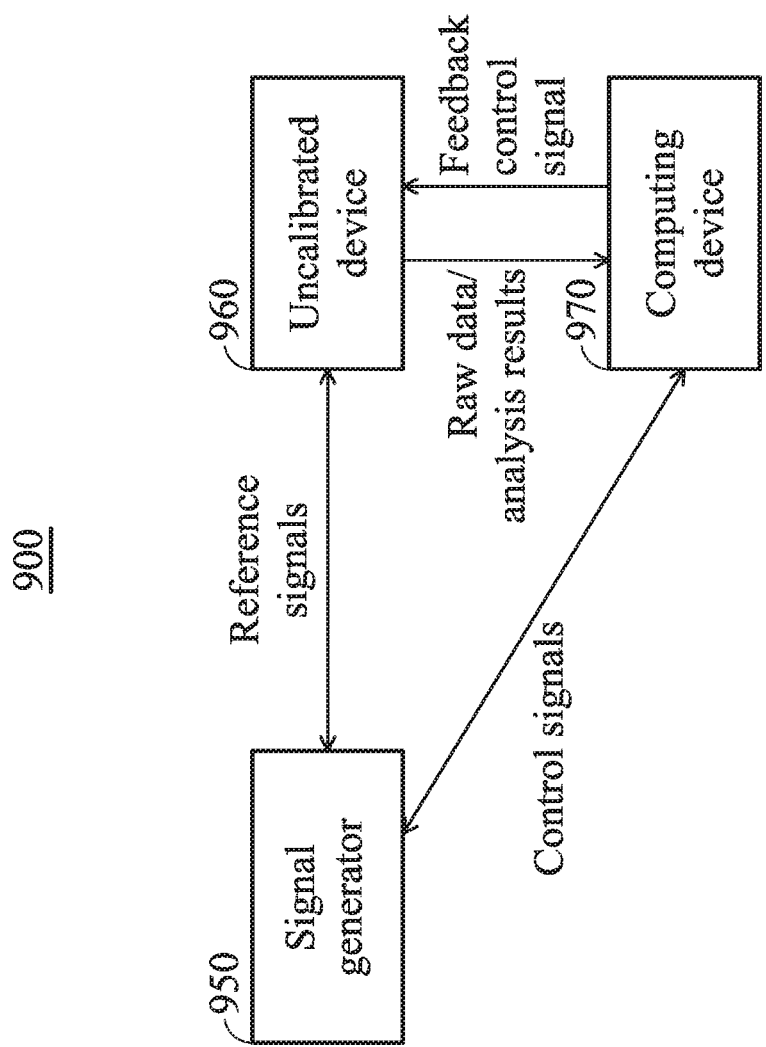
FIG. 9 shows an exemplary calibration system for calibrating an electronic device in order to generate a calibrated device according to an embodiment of the invention.

FIG. 9 shows an exemplary calibration system for calibrating an electronic device in order to generate a calibrated device according to an embodiment of the invention. The calibration system 900 may comprise a signal generator 950, an uncalibrated device 960 and a computing device 970. The signal generator 950 may generate reference signals and transmit the reference signals to the uncalibrated device 960 for calibration. The uncalibrated device 960 may be an electronic device or a portable electronic device that has not been calibrated, such as a mobile phone/pad, an access point, a test board (a Field-programmable gate array (FPGA), a PCI development card, a network card), etc. The computing device 970 may be a personal computer, a lap-top computer, a tablet, etc. The computing device 970 may transmit control signals to the signal generator 950 for controlling the calibration procedure. The uncalibrated device 960 may process the received reference signals to obtain raw data, or may further analyze the raw data to obtain the analysis result(s). The uncalibrated device 960 may transmit the raw data or the analysis result(s) to the computing device 970. Upon receiving the raw data or the analysis result(s), the computing device 970 may further analyze the raw data and/or use the analysis result(s) to determine a calibration value for any specific component that is undergoing the calibration procedure, and generate a feedback control signal comprising information regarding the calibration value for the specific component to the uncalibrated device 960. The uncalibrated device 960 may then adjust a corresponding parameter according to the calibration value to complete the calibration procedure for the specific component. Note that when the calibration procedure(s) for the component(s) (such as the external component circuit and/or the chip as shown, or the likes) that have to be calibrated in the uncalibrated device 960 is/are completed, the uncalibrated device 960 can be served as a calibrated device as discussed above. In addition, note that in the embodiments of the invention, the calibrated device is well-calibrated to a certain degree that is precise enough for performing the product test.

For example, when calibrating the TX power of the uncalibrated device 960, the computing device 970 may analyze the raw data received from the uncalibrated device 960 to determine the power offset value to be adjusted by the uncalibrated device 960, and generate a feedback control signal comprising information regarding the power offset value to the uncalibrated device 960. The uncalibrated device 860 may then adjust its TX power related component to complete the TX power calibration procedure.

As discussed above, conventionally, a dedicated test instrument is required to test an electronic product for a dedicated standard or technology, for example, the cellular communications technology, the GPS technology, the WiFi technology, and so on. The dedicated test instrument is usually very expensive since it is usually over-designed. Especially, when an electronic product supports multiple standards or technologies, the cost increases enormously since a plurality of test instruments, each of which supports one standard or technology, are required.

However, in the proposed test/calibration system, a low-cost calibrated device can be used to replace the expensive instrument. The calibrated device can be a low-cost device since it only has to be well-calibrated and does not have to be over-designed. In some embodiments of the invention, the calibrated device may be the same kind of device or product as the DUT. In some embodiments of the invention, the calibrated device may be a similar kind of device or product as the DUT but with some different functions.

In addition, the calibrated device may implement and support multiple standards or technologies, as well as the DUT. In this manner, only one calibrated device is required to test multiple standards or technologies, and the cost can be greatly reduced when compared to the conventional design. In addition, the calibrated device and/or the DUT may comprise one or more analyzers for analyzing the test data. In addition, the calibrated device and/or the DUT may also generate the control signal to initiate and control the test flow. In the embodiments of the invention, the time required for performing the product test can be reduced since frequent communication, such as control signal transmission, between the computing device and the calibrated device, between the computing device and the DUT, or between the calibrated device and the DUT can be avoided. In addition, when the calibrated device and/or the DUT comprises multiple analyzers, the analyzers can operate in parallel to analyze the test data of different test items concurrently. In this manner, the test speed can be greatly improved and the time required for performing the product test can be further reduced. In addition, compared to the expensive instrument, it is easy and also low-cost to maintain and update the calibrated device by simply replacing the calibrated device with another calibrated device supporting new standards. It is also easier to implement self-test in the calibrated device than in the expensive instrument.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A calibrated device, transmitting or receiving a test signal to or from a device under test (DUT) in response to a test item to test, measure or calibrate functioning or performance of an internal component of the DUT, comprising:
a chip, comprising:
at least one of an analog signal processing circuit and a baseband signal processing circuit; and
a memory device, coupled to at least one of the analog signal processing circuit and the baseband signal processing circuit; and
at least one external component, outside of the chip, processing the received test signal and transmit the processed signal to the chip for test result generation purpose, or receiving a signal from the chip and processing the signal to generate the test signal to be transmitted to the DUT; wherein the external component and/or the chip have been calibrated.

2. The calibrated device as claimed in claim 1, further comprising: an analyzer, analyzing test data to obtain a test result regarding the test item, wherein the test data is obtained from the at least one external component, the analog signal processing circuit or the baseband signal processing circuit.

3. The calibrated device as claimed in claim 1, further comprising: a plurality of analyzers, capable of analyzing test data concurrently, wherein the test data is obtained from the at least one external component, the analog signal processing circuit or the baseband signal processing circuit.

4. The calibrated device as claimed in claim 1, further comprising: a plurality of analyzers, each for analyzing test data of one test item to obtain a test result regarding the test item, wherein the analyzers are capable of analyzing the test data of different test items concurrently, and wherein the test data is obtained from the at least one external component, the analog signal processing circuit or the baseband signal processing circuit.

5. The calibrated device as claimed in claim 1, being implemented by a calibrated mobile device, a calibrated access point, or a calibrated test board.

6. A system, comprising:
a device under test (DUT); and
a calibrated device, coupled to the DUT, transmitting or receiving a test signal to or from the DUT in response to a control signal for a test item to test, measure or calibrate functioning or performance of and internal component of the DUT;
wherein the calibrated device comprises:
a chip, comprising:
at least one of an analog signal processing circuit and a baseband signal processing circuit; and
a memory device, coupled to at least one of the analog signal processing circuit and the baseband signal processing circuit; and
at least one external component, outside of the chip, processing the received test signal and transmit the processed signal to the chip for test result generation purpose, or receiving a signal from the chip and processing the signal to generate the test signal to be transmitted to the DUT; wherein the external component and/or the chip have been calibrated.

7. The system as claimed in claim 6, further comprising: a computing device, coupled to the DUT and the calibrated device, and transmitting the control signal to control a test flow of the test item.

8. The system as claimed in claim 7, wherein the calibrated device further device further receives the test data from the calibrated device and analyzes the test data to obtain a test result regarding the test item.

9. The system as claimed in claim 7, wherein the DUT further processes the received test signal to obtain test data of the test item, and the computing device further receives the test data from the DUT and analyzes the test data to obtain a test result regarding the test item.

10. The system as claimed in claim 6, wherein the control signal is generated by the calibrated device to control a test flow of the test item.

11. The system as claimed in claim 6, wherein the control signal is generated by the DUT to control a test flow of the test item.

12. The system as claimed in claim 6, wherein the calibrated device further processes the received test signal to obtain test data of the test item and analyzes the test data to obtain a test result regarding the test item.

13. The system as claimed in claim 6, wherein the DUT further processes the received test signal to obtain test data of the test item and analyzes the test data to obtain a test result regarding the test item.

14. The system as claimed in claim 6, wherein the calibrated device comprises: an analyzer, analyzing test data to obtain the test result regarding the test item.

15. The system as claimed in claim 6, wherein the calibrated device further comprises: a plurality of analyzers, capable of analyzing test data concurrently.

16. The system as claimed in claim 6, wherein the calibrated device further comprises: a plurality of analyzers, each for analyzing test data of one test item to obtain the test result regarding the test item, wherein the analyzers are capable of analyzing the test data of different test items concurrently.

17. The system as claimed in claim 6, wherein the calibrated device is implemented by a calibrated mobile device, a calibrated access point, or a calibrated test board.

* * * * *